United States Patent Office 3,147,314
Patented Sept. 1, 1964

3,147,314
CARBOXY TERMINATED COPOLYMERS OF VINYLIDENE FLUORIDE-HEXAFLUOROPROPENE
Edward F. Cluff, Brandywine Hundred, Del., assignor to E. I. du Pont de Nemours and Company, Wilmington, Del., a corporation of Delaware
No Drawing. Filed Feb. 29, 1960, Ser. No. 11,473
5 Claims. (Cl. 260—837)

This invention relates to novel copolymers and more particularly to copolymers having terminal carboxyl groups which are obtained from vinylidene fluoride and other fluorinated olefins.

Fluoroelastomers, such as those made from vinylidene fluoride and hexafluoropropene, are generally tough and difficult to process on conventional rubber machinery when they are polymerized to the high molecular weights necessary to give cured fluoroelastomers of outstanding high temperature and chemical resistance as well as good electrical properties. Easy processing copolymers of lower molecular weight are, when cured, inferior with respect to these properties. Also, curing these copolymers presents a problem in that conventional curing applicable to analogous high molecular weight polymers yields vulcanizates of highly inferior elastic properties.

It is an object of the present invention to provide novel copolymers. A further object is to provide a novel copolymer having terminal carboxyl groups. A still further object is to provide a fluid or semi-solid copolymer having terminal carboxyl groups which is capable of being cured to form an elastic or plastic solid having outstanding properties. Another object is to provide a process for the formation of these novel copolymers as well as a process whereby they may be cured to form highly useful materials. Other objects will appear hereinafter.

These and other objects of this invention are accomplished by novel copolymers which have a molecular weight corresponding to an inherent viscosity of about 0.04 to about 0.25 at 30° C. in 1.0 percent by weight solution in anhydrous, reagent grade acetone, which have a carboxyl content of from about 0.2 to about 3.75 percent by weight, based on the weight of the copolymer and which consist essentially of a multiplicity of $$-CH_2-CF_2-$$

and units

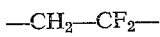

or a multiplicity of

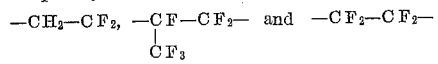

It is apparent from the above definition that the novel copolymers of this invention have a specified carboxyl, i.e., —COOH content and are made up of units derived from vinylidene fluoride along with units derived from hexafluoropropene, and, if desired, tetrafluoroethylene. These copolymers may be characterized as being fluids or semi-solids and may be cured to form highly useful solids. The weight percent ratio of vinylidene fluoride units to the other units in these novel carboxyl containing copolymers will determine whether a plastic or an elastic solid is obtained on curing.

The novel copolymers of this invention are prepared from the corresponding high molecular weight copolymers prepared from vinylidene fluoride, hexafluoropropene and, if desired, tetrafluoroethylene. These high molecular weight copolymers are converted to the novel lower molecular weight copolymers of this invention by a two step process. The first step involves a nitrogen base dehydrohalogenation of the high molecular weight copolymer so as to introduce a plurality of intralinear olefinic carbon-to-carbon double bond linkages. The second step involves an oxidation of the double bond linkages to cleave them with the subsequent formation of carboxyl groups.

As mentioned above the high molecular weight copolymers which are used as starting materials for the novel carboxyl containing copolymers of this invention are prepared by copolymerizing vinylidene fluoride with hexafluoropropene and, if desired, tetrafluoroethylene. In general, these high molecular weight copolymers are prepared by an emulsion polymerization of a mixture of the monomers in the presence of a redox catalyst system. High molecular weight copolymers of vinylidene fluoride and hexafluoropropene are described in "Industrial & Engineering Chemistry," vol. 49, p. 1687 (1957). The vinylidene fluoride, hexafluoropropylene and tetrafluoroethylene copolymers are described in U.S. Patent 2,968,649.

Any of the above mentioned copolymers are useful as starting materials in the present invention. In general, these copolymers should have an inherent viscosity of at least about 0.4 as determined at 30° C. in a 0.1 percent by weight solution in an anhydrous solvent mixture of 86.1 parts of tetrahydrofuran and 13.9 parts of dimethyl formamide.

In preparing the novel copolymers of this invention the high molecular weight copolymer is dissolved in an inert solvent. Suitable solvents include tetrahydrofuran, acetone and methylethyl ketone. A nitrogen base is then added and the mixture heated to a temperaure of from about 35° to 70° C. for a period of time of from about 6 to 24 hours, until the requisite number of olefinic carbon-to-carbon double bonds have been introduced into the copolymer. Heating in the presence of a nitrogen base effects dehydrohalogenation of the copolymer. Suitable nitrogen compounds are those having a $K_B$ of at least $1 \times 10^{-5}$. Representative compounds include amines such as n-butylamine, diethylamine, triethylamine, piperidene, cyclohexylamine, dicyclohexylamine, dimethyldodecylamine, dimethylcyclohexylamine, allylamine, diallylamine and dimethylbenzylamine. Ammonia, ammonium hydroxide or quarternary ammonium hydroxides are also included. The length of time required to effect dehydrohalogenation will be dependent on several variables, particularly the nature of the solvent, the temperature of heating, the nature or basicity of the specific nitrogen compound involved and the amount of this compound. These variables may be adjusted as desired by the skilled chemist. The preferred amount of nitrogen base to be used ranges from about 0.1 to 0.4 mole per 100 grams of the high molecular weight copolymer starting material. Specific illustrations of conditions are shown in the examples.

The high molecular weight copolymer, which now contains a plurality of olefinic carbon-to-carbon double bonds is now oxidized to cleave these bonds with the formation of carboxyl groups. The oxidation step is carried out by heating the dehydrohalogenated polymer at a temperature of from about 50° to 70° C. for a period of time of from about 3 to 24 hours in a solvent in the presence of an oxidizing agent. Suitable solvents include acetone or acetic acid. Suitable oxidizing agents include potassium permanganate or fuming nitric acid. The resulting carboxyl containing copolymer is then isolated, as more particularly illustrated in the examples.

As mentioned above, the novel copolymers of this invention are characterized by having an inherent viscosity of from about 0.04 to 0.25 at 30° C. in 1.0 percent by weight solution in anhydrous, reagent grade acetone. The viscosity measurement is an indication of molecular weight, the higher molecular weight copolymers exhibiting greater viscosity in a given solvent. Procedures for determining viscosity are well known, as for example in "Principles of Polymer Chemistry," by P. J. Flory, page 309, Cornell University Press (1953) and L. H. Cragg, "Rubber Chemistry and Technology," 19, 1092 (1946). Both the molecular weight of the starting material and the amount of nitrogen base used are factors influencing the inherent viscosity of the copolymers obtained.

The viscosity of limits are critical in that copolymers having viscosities of less than 0.04 are too fluid for easy processing with solid fluoroelastomers or for readily forming caulking compositions without high proportions of fillers. Additionally, the weight percent of carboxyl terminal groups is greater in these lower molecular weight polymers and this detracts from the desirable fluoroelastomer properties. At the other end of the range, when the copolymers have viscosities greater than 0.25 they do not have sufficient plasticising effects on the high molecular weight solid fluoroelastomers and are not fluid enough to be processed in caulking compounds.

The copolymers are further characterized by having a specified carboxyl content, which is from about 0.2 to 3.75 percent by weight, based on the weight of the copolymer. When the carboxyl content, i.e., the number of —COOH groups, is less than about 0.2 percent by weight, the copolymer can not be adequately cured with carboxyl-reacting curing agents to form a highly useful plastic or elastic solids. On the other hand, when the carboxyl content is greater than about 3.75 percent by weight the resulting copolymer is non-elastic and the increased amount of non-fluorocarbon material in the copolymer decreases the resistance of the product to the effects of temperature and solvents.

The novel copolymers of this invention have a wide variety of uses. They may be cured to form plastic or elastic solids. Conventional curing systems for known fluorinated copolymers may be employed or they may be cured by reacting the terminal carboxyl groups with polyvalent metal oxides or bases. The ratio of vinylidene fluoride to the other fluorinated olefins in the copolymer will determine the type of cured product obtained. Thus, for example, an elastomer will be obtained when the ratio of vinylidene fluoride to hexafluoropropene is from about 70 to 30 weight percent vinylidene fluoride to 30 to 70 weight percent of the other monomer.

The copolymers of this invention may be used as caulking compositions. By proper compounding the copolymers can be used to fill in irregularly shaped voids which would be difficult, if not impossible, to accomplish heretofore with known fluoroelastomers. When such forms can be subjected to conventional curing procedures, the usual fluoroelastomer curing agents may be used. These copolymer caulking compositions can also be cured at room temperature by incorporating therein a polyvalent metal oxide which will react with the carboxyl groups. Even after standing only a day, the compounded caulks are transformed to solid, rubbery masses.

The copolymers of this invention may be cured with organic compounds containing two or more epoxy groups. These epoxy compounds constitute the preferred class of curing agents. These compounds are readily incorporated into the copolymers of this invention. After incorporation of the epoxy compounds, for example, on a rubber roll mill, and any additional compounding ingredients such as carbon black, silica, and the like, the compounded stock may be shaped by pressing into molds or other forms or may be used otherwise, for example as a caulk. These compositions do not begin to cure at room temperature for at least an hour, so that adequate processing time is available. The resulting composition may then be cured in molds, or not in molds, as desired, with or without the application of external pressure. Furthermore, curing will take place at temperatures ranging from room temperature to about 200° C. The cure is slow at room temperature and several days are required for the development of optimum elastomeric properties. Curing is accomplished in 1 to 2 hours at about 150° C. Suitable epoxy compounds include butadiene dioxide, diglycidyl ether; polyglycidyl ethers of glycerol or other polyols such as erythritol; glycidyl ethers of polyhydric phenols such as resorcinol, hydroquinone and phloroglucinol; the "Epon" Resins of the general formula

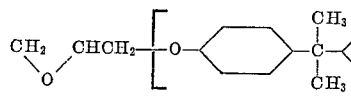 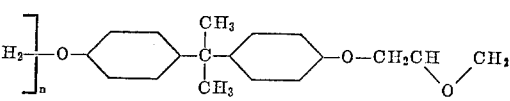

wherein $n$ is an integer from 0 to 10; glycidyl ethers of bisphenol F; pyromellitic dianhydride; dicyclopentadiene diepoxide; the diglycidyl ether of tetramethyl-bis(3-hydroxypropyl)disiloxane; etc.

The copolymers of this invention may also be used as plasticizers for the higher molecular weight fluoroelastomers. The fluoroelastomers have excellent resistance to solvents and heat, but are difficult to process. Incorporation of relatively small amounts of the copolymers of this invention into the fluoroelastomers plasticizes them so that they can be readily processed with ordinary rubber machinery. Since these copolymers also have a polymer chain which is similar to that of the fluoroelastomers, they vulcanize or cure under the same conditions and become integral parts of the cured fluoroelastomer.

The following examples will better illustrate the nature of the present invention; however, the invention is not intended to be limited to these examples. Parts are by weight unless otherwise indicated.

The neutralization equivalent of the copolymers prepared in the examples was determined as follows:

10–15 grams of the copolymer was dissolved in 100 ml. of ethyl ether and extracted twice with 50 ml. of water. The ether solution was dried with magnesium sulfate and filtered. The ether was evaporated from the filtrate and the last traces of ether were removed by heating in a vacuum oven at 60° C. overnight.

An accurately weighed sample (1 to 1.5 g.) of the copolymer was dissolved in 100 ml. of acetone (analytical reagent grade) and titrated with 0.01 N KOH solution in methanol using a Beckman pH meter and a glass electrode.

The inherent viscosities of the copolymers illustrated in the examples were measured on the copolymer purified by the method described for the neutralization equivalent determination.

*Example 1*

400 parts of a copolymer of vinylidene fluoride and hexafluoropropene, the moieties being in the weight ratio of 60:40, having an inherent viscosity of 0.9 at 30° C. in 0.1 percent concentration in an anhydrous solvent consisting of 86.1 percent of tetrahydrofuran and 13.9 percent of dimethyl formamide (hereafter called "the THF/DMF solvent"), was dissolved in 1330 parts of tetrahydrofuran. 80 parts of triethylamine was then added and the solution was heated to reflux for about 20 hours. The resulting solution was poured into a large excess of water and the copolymer precipitated. The copolymer was collected from the water and placed on a corrugated rubber wash mill where it was washed with water to remove residual solvent, amine and amine hydrofluoride.

The copolymer was then dissolved in 1584 parts of cold acetone and 126 parts of potassium permanganate was added gradually while agitating. The mixture gelled in about 10 minutes and was then allowed to stand overnight. The next morning the gel had broken. The mixture was then heated to reflux for about 3 hours when the color of permanganate had completely disappeared. 29 parts of water was added and hydrogen chloride was bubbled through the thick suspension until the viscosity appeared to decrease no further and the solid matter settled to the bottom. The mass was filtered, and the filtrate was evaporated under reduced pressure to recover the copolymer. The copolymer was then heated on a steam bath and finally at 90° C. in a vacuum oven to remove residual solvent.

398 parts of a sticky, grease-like copolymer was obtained. It had an inherent viscosity at 30° C. in 1.0 percent solution in anhydrous acetone of 0.096. It showed a strong infrared absorption at 5.63 microns which is characteristic of the —$CF_2COOH$ group. It had a neutralization equivalent of 7440. The copolymer has a carboxyl content of 0.61 percent by weight.

100 parts of the copolymer was compounded on a rubber mill with 6 parts of magnesium oxide. The compounded mass, suitable for use as a caulking compound, was cured in a mold in a press at 150° C. for 45 minutes. The cured elastic product was immersed in the following solvents for 3 days at room temperature with the results shown:

| Solvent: | Percent increase in weight |
|---|---|
| Toluene | 8.4 |
| Hexane | 0.3 |
| ASTM Oil No. 3 | 0.35 |

*Example 2*

50 parts of a copolymer of vinylidene fluoride and hexafluoropropene, in weight ratio of 48:52, having an inherent viscosity of 1.7 at 30° C. in 0.1 percent concentration in the THF/DMF solvent was dissolved in 310 parts of tetrahydrofuran. Then 1.85 parts of n-butylamine was added and the solution was heated at reflux overnight while agitating. During this time the mass thickened, indicating some gelation of the copolymer. It was poured into a large excess of water to precipitate the copolymer which was then collected and washed with hot water in a Waring blendor.

The wet copolymer was dissolved in 1190 parts of acetone and 4 parts of potassium permanganate was added. The mass was then heated to reflux while agitating overnight. By the end of this time the copolymer no longer showed the partial gel structure. 1 part of water was added and hydrogen chloride gas was bubbled into the mass until the dispersed solid settled to the bottom of the vessel. The solid was then filtered off and the acetone evaporated under vacuum. The residual solvent was removed by heating in a vacuum oven at 100° C. for 2 hours.

52 parts of a tacky semi-solid product was obtained which had an inherent viscosity at 30° C. at 1.0 percent concentration in anhydrous acetone of 0.106. Infrared showed the absorption at 5.63 microns as in the preceding example. The product had a neutralization equivalent of 10,400 which shows the presence of 0.43 percent by weight of carboxyl groups.

*Example 3*

The process of Example 2 was repeated except that the vinylidene fluoride-hexafluoropropene copolymer starting material had a weight ratio of 76:24 and an inherent viscosity of 0.45 in the THF/DMF solvent. An equal weight of diethylamine was substituted for the n-butylamine. 54 parts of a soft solid product was obtained having an inherent viscosity of 0.18 at 30° C. in 1.0 percent concentration in anhydrous acetone and showing characteristic infrared absorption at 5.63 microns. The neutralization equivalent was 6100 or a carboxyl content of 0.74 percent by weight.

*Example 4*

267 parts of a copolymer of vinylidene fluoride and hexafluoropropene (weight ratio 60/40) having an inherent viscosity of 0.9 in the THF/DMF solvent at 0.1 percent concentration at 30° C. was dissolved in 792 parts of acetone in an enamel-lined autoclave. 10 parts of 28 percent ammonium hydroxide was added, the autoclave was closed and the contents were stirred for 13 hours at 55° C. The autoclave was then vented and nitrogen was bubbled through for 25 minutes to remove residual ammonia. To the reaction mass was added 21.1 parts of potassium permanganate and the mass was stirred at 55° C. for 3 hours and then cooled to room temperature. 10 parts of water was added to the resulting slurry and hydrogen chloride was passed into the suspension until the solid settled to the bottom. The mass was filtered, the filtrate was dried with magnesium sulfate, filtered again, and the solvent was evaporated. The last traces of solvent were removed by heating in a vacuum oven at 60° C. 265 parts of putty-like copolymer was obtained.

The copolymer had an inherent viscosity of 0.21 in anhydrous acetone at 1.0 percent concentration at 30° C. and a neutralization equivalent of 19,400. This is equal to a carboxyl content of 0.23 percent by weight.

20 parts of this copolymer and 100 parts of a high molecular weight copolymer, having an inherent viscosity of 0.9 in 0.1 percent solution in the THF/DMF solvent, of vinylidene fluoride and hexafluoropropene (weight ratio 60/40) were blended together on a rubber roll mill. The mixture had a Mooney viscosity of 36 (ML–10 at 100° C.) whereas the unplasticized high molecular weight copolymer had a Mooney viscosity of 60.

The plasticized copolymer (A) and the unplasticized copolymer (B) were compounded as shown below and cured in a press for 1 hour at 150° C. and then held in an oven for 1 hour at 140° C. and then 24 hours at 204° C. The properties of the cured fluoroelastomers are shown in the table.

| Components | Parts by Weight | |
|---|---|---|
| | (A) | (B) |
| VF$_2$/HFP copolymer (B) | | 100 |
| Plasticized copolymer (A) | 100 | |
| Magnesium oxide | 16 | 16 |
| Medium thermal black | 18 | 18 |
| Ethylene diamine carbamate | 1.5 | 1.5 |
| Properties: | | |
| Tensile strength at the break (lbs./sq. in.) | 1,800 | 2,200 |
| Modulus at 100% elongation, (lbs./sq. in.) | 505 | 560 |
| Elongation at break, percent | 190 | 200 |

It is evident that the use of the carboxyl containing copolymer as a plasticizer for the fluoroelastomer reduces the viscosity of the stock to a satisfactory level for compounding and molding and at the same time detracts very little from the properties of the cured fluoroelastomer. Furthermore, since it is so similar in structure, it is cocured and will not bloom to the surface.

*Example 5*

200 parts of a copolymer of vinylidene fluoride and hexafluoropropene (weight ratio 60/40) having an inherent viscosity of 0.9 in the THF/DMF solvent at 0.1 percent concentration at 30° C. was dissolved in 887 parts of tetrahydrofuran. Then 80 parts of triethylamine was added and the mixture was heated to reflux while stirring for 20 hours. The copolymer was precipitated by pouring the solution into a large excess of water, collected and transferred to a corrugated rubber roll mill where it was washed with water to remove the tetrahydrofuran.

The wet copolymer was dissolved in 792 parts of acetone and 94.8 parts of potassium permanganate was added while agitating. The mixture gelled in about 10 minutes and agitation was stopped. The mass was then let stand overnight. Another 31.6 g. of potassium permanganate was added and the mixture was then heated to reflux until the color of permanganate disappeared.

190 parts of hydrochloric acid (37%) was added to precipitate the solid and then the mass was filtered. The filtrate was evaporated and the residue was heated in a vacuum oven at 100° C. to dry it. 201 parts of a tacky fluid copolymer was obtained. It had an inherent viscosity of 0.078 in anhydrous acetone at a 1.0 percent concentration at 30° C. It had a neutralization equivalent of 3,600 or a carboxyl content of 1.25 percent by weight.

A caulking compound was prepared by mixing 100 parts of the copolymer and 6 parts of magnesium oxide. The putty-like mass was then used to caulk a wood joint. The caulk cured at room temperature overnight to a non-tacky, rubbery solid. Samples of the cured caulking compound were immersed in the following solvents with results shown below:

| Solvent: | Weight gain, percent |
| --- | --- |
| Xylene | 2.6 |
| ASTM Oil No. 3 | 1.5 |

Example 6

50 parts of a high molecular weight terpolymer of vinylidene fluoride/hexafluoropropene/tetrafluoroethylene (weight ratio 45/30/25), having an inherent viscosity of 1.07 in the THF/DMF solvent, was dissolved in 355 parts of tetrahydrofuran and 10 parts of triethylamine was added. The mixture was stirred and heated to reflux for 16 hours. The reaction mass was poured into a large excess of water, the precipitated copolymer was collected, transferred to a corrugated rubber roll mill and washed with water to remove the solvent, amine and amine salts.

The wet copolymer was dissolved in 317 parts of acetone and 15.8 parts of potassium permanganate was added. The mixture was stirred and heated to reflux for 3 hours. About 160 parts of the acetone was then distilled off and 150 parts of water was added. 48 parts of hydrochloric acid (37%), 20 parts of sodium sulfite, and 150 parts of water were added to reduce the insoluble manganese compounds to a water-soluble form. The copolymer, which was insoluble in this system, was then washed by agitating with successive portions of water until the wash water was acid-free. The copolymer was then dried at 70° C. in a vacuum oven. The resulting colorless, tacky, viscous fluid had an inherent viscosity in 1 percent solution in acetone at 30° C. of 0.084 and a neutralization equivalent of 8940 which corresponds to a carboxyl content of 0.50 percent by weight.

Example 7

200 parts of a high molecular weight copolymer of vinylidene fluoride and hexafluoropropylene (weight ratio 60/40) having an inherent viscosity of 0.9 in the THF/DMF solvent at 0.1 percent concentration at 30° C. was dissolved in 666 parts of tetrahydrofuran. Then 40 parts of triethylamine was added and the mixture was heated to reflux while stirring for about 16 hours. The copolymer was precipitated by pouring the solution into a large excess of water, collected and transferred to a corrugated rubber roll mill where it was washed with water to remove the residual amine and tetrahydrofuran.

The wet copolymer was dissolved in 633 parts of acetone and 15.8 parts of potassium permanganate was added while agitating. The mixture was heated to reflux while stirring for 3 hours. A solution of 11 parts of sodium bisulfite and 32.1 parts of hydrochloric acid (37%) in 150 parts of water was added to the agitated reaction mass which immediately turned light yellow and separated into two layers. The copolymer was precipitated by the addition of a large excess of water. The supernatant aqueous phase was decanted and the copolymer was washed acid free by stirring with hot water. A small amount of foreign matter was removed by dissolving the copolymer in 445 parts of tetrahydrofuran and filtering. The solvent was removed by heating under vacuum. A small amount of water remaining in the copolymer was removed by codistillation with 176 parts of benzene. The residual benzene in turn was removed by heating under vacuum while stirring. 177 parts of a tacky fluid copolymer was obtained. It had an inherent viscosity of 0.17 in anhydrous acetone at a 1.0 percent concentration at 30° C. It had a neutralization equivalent of 11,020 or a carboxyl content of 0.41 percent by weight.

100 parts of the copolymer was compounded with 2.5 parts of the diglycidyl ether of 2,2-bis(p-hydroxyphenyl) propane and 0.84 parts of di-o-tolylguanidine. The product was a soft, workable mass suitable for caulking or as a putty. A portion of the mass was heated in a mold in a press at 150° C. for 1 hours and then heated in an oven at 200° C. overnight. The cured elastic product had an elongation at break of 380% and a tensile strength of 355 lbs./sq. in.

Example 8

Into a 12 liter 4-necked round bottom flask fitted with a stirrer, thermometer and Dry Ice condenser was added 6.8 liters of acetone and 4 lbs. of a copolymer of vinylidene fluoride and hexafluoropropylene, the components being present in a weight ratio 60/40. The inherent viscosity of this copolymer in the THF/DMF solvent at 30° C. (0.10% solution) was 0.9. The mixture was stirred at 50° C. until all the copolymer had dissolved. Then 474 ml. of 29 wt. percent ammonium hydroxide was added. The flask was stoppered and held at 40° C. for 24 hours. At the end of this time 150 ml. of glacial acetic acid was added to neutralize the residual ammonium hydroxide. The acetone solution was then poured into several volumes of water and the coagulated copolymer wash-milled with water to remove residual solvent and inorganic salts. The copolymer was then dissolved in 4.8 liters of glacial acetic acid by agitating in a 12 liter flask. When solution was complete, the copolymer was oxidized by adding 383 g. of potassium permanganate and heating to 50° for about 2 hours. The dark brown mixture was then cooled to 45° and a solution of 374 g. of 96% sulfuric acid in 375 ml. of water was added. The reaction mixture thickened up and turned a slightly lighter brown color. Then a solution of 256 g. of sodium bisulfite in 480 ml. of water was added. The mixture became even thicker to the point where it could almost not be stirred. An additional 50 ml. of sulfuric acid dissolved in 50 ml. of water was added and then 700 ml. of water was added. The mixture became very loose, was easily stirred and turned white. The mass was then diluted to 12 liters with water. Most of the insoluble white solids dissolved leaving 2 liquid layers. The top layer was siphoned off and 6 liters of water was added to the residue in the flask and the mixture stirred. The aqueous layer was again drained from the flask and an additional 5 liters of fresh water was added. Stirring was continued for 15 minutes. The water was again drained and 5 liters more water was added. The mixture was heated to 90° C. and stirred for ½ hour. The water was drained again, an additional 4 liters of water was added, and the mixture was stirred at room temperature. The mixture now had a pH 5. The water was drained again and 2 liters of benzene was added. The water present was removed by azeotropic distillation. The benzene was removed by heating to 130° C. under vacuum. Final traces of benzene were removed by stirring and heating for ½ hour at 145° under vacuum. The yield of copolymer obtained in this manner was 1,643 g. (90% of theory), it had an inherent viscosity of 0.091 in anhydrous acetone at 1.0 percent concentration of 30° C. and had a carboxyl content of 0.90 precent by weight.

100 part portions of the copolymer were compounded on a rubber roll mill with 20 parts of medium thermal carbon black and then the different epoxy compounds shown below were milled in:

(A) 7.5 parts of the diglycidyl ether of 2,2-bis(p-hydroxyphenyl)propane and 1 part of pyromellitic di-anhydride.

(B) 5 parts of the digylcidyl ether of 2,2-bis(p-hydroxyphenyl)propane and 3 parts of the glycidyl ether of a phenol-formaldehyde condensate of functionality 3.3 having the general formula

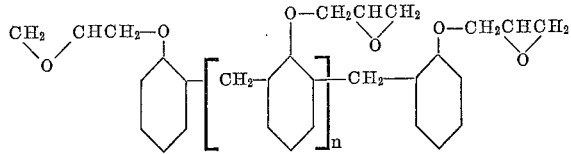

(C) 6 parts of the tetraglycidyl ether of 1,1,2,2-tetra(p-hydroxyphenyl)ethane.

(D) 7 parts of the glycidyl ether of a phenol-formaldehyde condensate of functionality 3.3 (see B above).

(E) 9 parts of dicyclopentadiene diepoxide and 1 part of pyromellitic di-anhydride.

(F) 5 parts of the glycidyl ether of a phenol-formaldehyde condensate of functionality 3.3 (see B above) and 5 parts of the diglycidyl ether of tetramethyl-bis (3-hydroxypropyl)-disiloxane of the formula

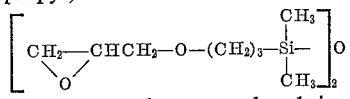

The compounded stocks were placed in slab molds 1 inch x 5 inches x 75 mils and cured as shown in the table below. The stress strain properties of the cured products were determined on an Instron testing machine using a cross-head speed of 10 inches per minute. The tests were made on dumbbells die-cut from the cured slabs and at 25° C.

As shown in the following table, a wide variety of properties may be obtained by varying the epoxy curing agent and the cure conditions:

| Cure | A | B | C | D | E | F |
|---|---|---|---|---|---|---|
| | 2 hrs./ 150° C. in press | 6 days room temp. | 2 hrs./ 150° C. | 2 hrs./150° C. in press + 6 hrs./140° C. in oven | 2 hrs./150° C. in press + 16 hrs./140° C. in oven | 16 hrs./140° C. + 24 hrs./204° C. all in oven |
| Modulus at 100% elongation, lbs./sq. in.. | 265 | 155 | 185 | 570 | 960 | 125 |
| Modulus at 200% elongation, lbs./sq. in.. | 580 | 440 | 255 | | | |
| Elongation at break, percent | 205 | 210 | 250 | 140 | 110 | 190 |
| Tensile strength at break, lbs./sq. in. | 600 | 490 | 260 | 1,100 | 1,010 | 350 |

This application is a continuation-in-part of my co-pending application Serial No. 831,477, filed August 4, 1959, now abandoned.

As many widely different embodiments of this invention may be made without departing from the spirit and scope thereof, it is to be understood that this invention is not limited to the specific embodiments thereof except as defined in the appended claims.

What is claimed is:

1. A carboxyl-terminated copolymer selected from the group consisting of (a) vinylidene fluoride-hexafluoropropene copolymer and (b) vinylidene fluoride-hexafluoropropene-tetrafluoroethylene copolymer, said copolymer having a carboxyl content of from about 0.2 to about 3.75 percent by weight and having an inherent viscosity of from about 0.04 to about 0.25 at 30° C. in 1.0 percent by weight solution in anhydrous acetone.

2. Carboxyl-terminated vinylidene fluoride-hexafluoropropene copolymer having a carboxyl content of from about 0.2 to about 3.75 percent by weight and having an inherent viscosity of from about 0.04 to about 0.25 at 30° C. in 1.0 percent by weight solution in anhydrous acetone.

3. Carboxyl-terminated vinylidene fluoride-hexafluoropropene-tetrafluoroethylene copolymer having a carboxyl content of from about 0.2 to about 3.75 percent by weight and having an inherent viscosity of from about 0.04 to about 0.25 at 30° C. in 1.0 percent by weight solution in anhydrous acetone.

4. A process for preparing a copolymer having a carboxyl content of from about 0.2 to about 3.75 percent by weight and having an inherent viscosity of from about 0.04 to about 0.25 at 30° C. in 1.0 percent by weight solution in anhydrous acetone which comprises dissolving a high molecular weight copolymer in an inert solvent, said high molecular weight copolymer having an inherent viscosity of at least about 0.4 at 30° C. in 0.1 percent by weight solution in an anhydrous solvent consisting of 86.1 percent of tetrahydrofuran and 13.9 percent of dimethyl formamide and being selected from the group consisting of (a) vinylidene fluoride-hexafluoropropene copolymer and (b) vinylidene fluoride-hexafluoropropene-tetrafluoroethylene copolymer; adding a nitrogen base having a $K_B$ of at least $1 \times 10^{-5}$ to said solution and heating to a temperature of from about 35° to 70° C. for from about 6 to 24 hours so as to introduce a plurality of intralinear olefinic carbon-to-carbon double bond linkages in said high molecular weight copolymer; heating the resulting copolymer at a temperature of from about 50° to 70° C. for from about 3 to 24 hours in the presence of an oxidizing agent and recovering the carboxyl-containing copolymer.

5. A cured material obtained by heating the copolymer of claim 1 with an organic compound having at least two epoxy groups of the structure

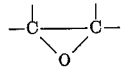

References Cited in the file of this patent
UNITED STATES PATENTS

| 2,604,464 | Segal et al. | July 22, 1952 |
| 2,820,776 | Robb et al. | Jan. 21, 1958 |
| 2,833,752 | Honn et al. | May 6, 1958 |
| 2,888,446 | Herbst et al. | May 26, 1959 |
| 2,914,514 | Lo | Nov. 24, 1959 |
| 2,918,501 | Brehm et al. | Dec. 22, 1959 |
| 2,997,448 | Hochberg | Aug. 22, 1961 |

OTHER REFERENCES

Dixon et al.: Ind. and Chem. Eng., vol. 49, No. 10, October 1957, pages 1687–1690.